UNITED STATES PATENT OFFICE.

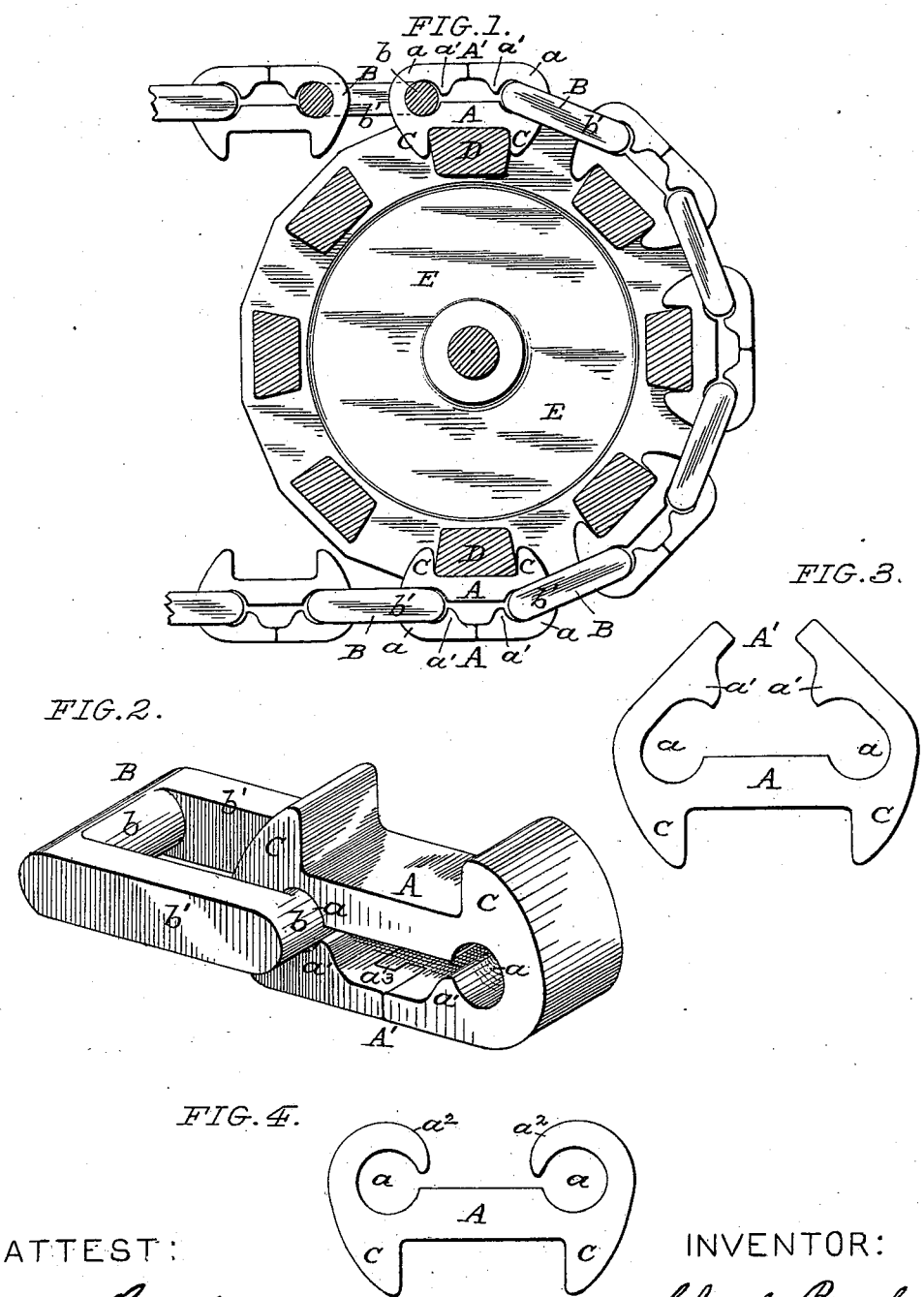

CHARLES BERNHARDT, OF CHICAGO, ILLINOIS, ASSIGNOR OF TWO-THIRDS TO MICHEAL J. KENNY AND GEORGE J. ADAM, BOTH OF SAME PLACE.

CHAIN-GEARING.

SPECIFICATION forming part of Letters Patent No. 342,567, dated May 25, 1886.

Application filed January 20, 1886. Serial No. 189,218. (No model.)

*To all whom it may concern:*

Be it known that I, CHARLES BERNHARDT, a citizen of the United States, and a resident of Chicago, in the county of Cook and State of Illinois, have invented certain new and useful Improvements in Chain-Gearing; and I do hereby declare the following to be a full, clear, and exact description of the same, reference being had to the accompanying drawings, forming a part of this specification, and in which—

Figure 1 is a longitudinal section of my improved chain belt and wheel or pulley; Fig. 2, an enlarged perspective view of a pair of the links employed to form my improved chain; Fig. 3, an enlarged side elevation of one of the main or driving links in an open condition to receive the adjacent plain connecting-links, and Fig. 4 an enlarged side elevation of a modified form of said main or driving link.

Similar letters of reference indicate like parts in the several views.

My invention relates to improvements in that type of belt-gearing in which is employed a linked belt or chain having projections to engage with recesses in the periphery of its carrying-pulleys and impart or receive positive motion to or from the same, as the case may be; and my present improvement has for its objects, first, to furnish a chain and pulley of a simple, cheap, and durable construction, by the use of which the parts will be caused to mesh together in a proper and accurate manner under the varying strains to which the parts will be exposed in use; second, to afford means for holding the driven or driving teeth or lugs of the chain belt in proper relative position to the driving or driven cross-bars or cogs of the carrying-pulley.

To enable others skilled in the art to which my invention appertains to make and use the same, I will now proceed to more fully describe its construction and mode of operation.

As shown in the drawings, the chain of my improved gearing consists of alternate lugged or main links, A, and plain connecting or intermediate links, B. The main links A are formed by a flat rectangular body having at each end transverse hook-shaped eyes $a$, formed by return-bend branch members A', integral with the main body of the link, and left open for the insertion of the rounded end bars, $b$, of the connecting-links B.

$a'$ are curved projections on the inner face of the members A', which, when said members are forced into a closed position, form a portion of the walls of the eyes $a$, as indicated in Figs. 1 and 2, the open position of the link to admit of the introduction of the connecting-links B being shown in Fig. 3.

In some cases the above construction of the main links A may be modified by omitting the end portions of the branch members A', that meet at the center of the link, and bending such member in the manner shown in Fig. 4, to form curved lips $a^2$, for holding the end bars of the links B in position, yet the first-described construction is preferred, as it admits of the top of the links being made without any projecting parts to accidentally catch or bind against foreign bodies. It also enables me to unite said members together by locking-lugs $a^3$, so as to impart additional strength to the link, and thus more perfectly obviate the tendency to bending of the body of the link or opening of the eyes of the same when exposed to heavy strains.

The intermediate or connecting links, B, are of a plain rectangular form, the side bars, $b'$, being preferably of a square or rectangular shape, so as to have a bearing against the sides of the eyes $a$, and thus limit within a certain degree the twisting or circular flexibility of the chain.

At each end of the main chain-link A there is formed a tooth or lug, C, that projects in a direction opposite to that of the eye $a$, and which, in conjunction with its mate at the opposite end of the link, forms a recess or tooth-space for the reception of one of the transverse bars or cogs D of the lantern-wheel E, as indicated in Fig. 1, so as to insure a positive engagement and movement of the parts with relation to each other in manner similar to ordinary cog or toothed gearing, and in order to maintain such parts in proper relative position to each other I extend the edges of the side flanges or rims of said wheel a small distance out from the transverse bars or cogs D, and form the periphery of the same with facets or polygonal faces $e$, to receive and form a rest for the side bars, $b'$, of the links B, to hold the aforesaid parts in proper position. This sprocket-wheel construction is not herein claimed, and I reserve the right of making it the subject-matter of a separate application.

The chain-links are made, preferably, of malleable iron, yet any other suitable malleable metal may be employed instead, as found most desirable or convenient.

My improved chain gearing is specially adapted for operating the winding-roll of machine-awnings for stores, dwellings, &c., yet it can be used for any other purpose for which it may be found suitable without departing from the spirit of my invention.

I am aware that prior to my invention chain gearing has been constructed with engaging-lugs to form a positive connection with its carrying chain-wheel. I am also aware that drive-chains have been formed of links having eyes at each end for the pivotal attachment of alternating plain rectangular links. I therefore do not claim such features of construction, broadly; but What I do claim as my invention, and desire to secure by Letters Patent, is—

A drive chain gearing, having its chain composed of an alternate plain link, and a main link having return-bend eyes $a$, formed substantially as described, and projecting end cogs, C, adapted to form a cog-space for the reception of a cog-bar, D, of the lantern-wheel E, the parts being constructed and arranged as herein described, and for the purpose set forth.

In testimony whereof witness my hand this 9th day of January, 1886, at Chicago, Illinois.

CHAS. BERNHARDT.

In presence of—
 ROBERT BURNS,
 M. J. KENNY.